United States Patent [19]

De Boel et al.

[11] Patent Number: 4,654,268
[45] Date of Patent: Mar. 31, 1987

[54] TRANSPARENT FIRE SCREENING PANELS AND THEIR MANUFACTURE

[75] Inventors: Marcel De Boel, Chatelet; Michel Bosquee, Aiseau-Presles; Pierre Goelff, Nalinnes, all of Belgium

[73] Assignee: Glaverbel, Brussels, Belgium

[21] Appl. No.: 711,226

[22] Filed: Mar. 13, 1985

[30] Foreign Application Priority Data

Mar. 15, 1984 [GB] United Kingdom ............... 8406742

[51] Int. Cl.⁴ .................... B32B 9/00; B29C 9/10; B29C 63/16
[52] U.S. Cl. ............................ 428/426; 34/110; 34/120; 264/1.2; 264/2.7; 264/101; 264/140; 264/144; 264/259; 264/261; 264/314; 428/428; 428/446; 428/921
[58] Field of Search ............... 264/144, 140, 1.2, 2.7, 264/101, 259, 261, 314; 34/120, 110; 428/446, 428, 426, 921

[56] References Cited

U.S. PATENT DOCUMENTS

| | | | |
|---|---|---|---|
| 2,478,885 | 8/1949 | Alvey ........................... | 264/144 |
| 2,556,954 | 6/1951 | Zeigler et al. ............... | 34/120 X |
| 2,688,771 | 9/1954 | Jandacek ...................... | 264/144 X |
| 3,071,816 | 1/1963 | Allen et al. .................. | 264/144 X |
| 3,228,454 | 1/1966 | Kett ............................. | 34/110 X |
| 3,799,252 | 3/1974 | Soll .............................. | 34/120 X |
| 4,268,581 | 5/1981 | De Boel ........................ | 428/446 X |
| 4,451,312 | 5/1984 | Nolte ............................ | 428/921 |

FOREIGN PATENT DOCUMENTS 2023452  7/1982  United Kingdom ............... 264/1.2

OTHER PUBLICATIONS

*Buflovak Drum Dryers: Atmospheric and Vacuum Types for Drying Solutions and Slurries,* Bulletin 285, Buffalo, N.Y., Buffalo Foundry & Machine Co., ©1935, pp. 16-19.

*Buflovak Drum Dryers for Chemicals, Food Products, Pharmaceuticals: Atmospheric and Vacuum Types for Drying Solutions and Slurries,* Bulletin 316, Buffalo, N.Y., Buffalo Foundry & Machine Co., ©1939, pp. 20-23.

Nonhebel, G. and A. A. H. Moss, *Drying of Solids in the Chemical Industry,* London, Butterworths, ©1971, pp. 161-163.

Primary Examiner—Philip Anderson
Attorney, Agent, or Firm—Spencer & Frank

[57] ABSTRACT

A method for processing intumescent material which forms a layer of a transparent fire-screening panel, which method includes forming a layer containing an aqueous solution of intumescent material on a cyclically moving support, removing water from the layer of material on the support by applying heat, removing the intumescent layer from the support within one cycle of its application thereto in such a manner that the layer becomes reworked or broken, and incorporating the removed intumescent material into a glazing panel.

22 Claims, 6 Drawing Figures

TRANSPARENT FIRE SCREENING PANELS AND THEIR MANUFACTURE

This invention relates to a method of manufacturing a transparent fire-screening panel comprising at least one glazing sheet and associated intumescent material, and to panels produced by such a method.

In such panels it is clearly desirable that the intumescent material should not be in a free-flowing liquid state so as to avoid the necessity of sealing means to ensure that the intumescent material stays in its required position. Thus it is known to use intumescent material in sheet or film form and in granular form as proposed in BFG Glassgroup's British Pat. No. GB 2 023 452B.

As is well known in the art, the materials principally used to form the intumescent material are aqueous solutions which require drying to give a solid intumescent product. The prior art shows that the drying of intumescent material preparatory to its incorporation into fire-screening panels involves significant problems and the prior art is replete with proposals for solving them. One particular problem which is particularly difficult to solve is that of removing sufficient water from an aqueous solution of intumescent material to form a valuable fire-screening product while avoiding the formation of a crust on the surface of the intumescent material during drying without resorting to very long drying time for example several hours or even several days, as has previously been proposed. Such drying times necessitate the stock-piling of large surface areas of the intumescent material during drying and this can be very costly when manufacturing fire-screening panels on an industrial scale. Another problem is to avoid the appearance of bubbles in the intumescent material. The presence of a crust on or bubbles in the intumescent material is especially disadvantageous when it is desired to manufacture transparent fire-screening panels. The presence of a crust also inhibits further drying of the intumescent material.

It is an object of the present invention to provide a method by which water can be removed from aqueous intumescent material preparatory to its use in a fire-screening panel.

According to the present invention, there is provided a method of manufacturing a transparent fire-screening panel comprising at least one glazing sheet and associated intumescent material, characterised in that the panel is formed by a process which includes forming a layer containing an aqueous solution of intumescent material on a cyclically moving support, removing water from the layer of material on the support by applying heat, removing the intumescent layer from the support within one cycle of its application thereto in such manner that the layer becomes reworked or broken and incorporating the removed intumescent material into a said panel before or after making any further required adjustment to the water content of the intumescent material.

The amount of water removed from the intumescent material while it is on the support may be controlled, for example by regulating the heating and/or the speed of the support so that on leaving, the intumescent material has any desired residual water content. By way of example, the intumescent material may be removed as a viscous ribbon which requires a further reduction in its water content. In such a case, the reworking of the intumescent material which takes place as it is removed from the support will break up any crust which may have formed so that the crustal material can be at least partially resorbed into the ribbon. Thus any such crust will not impede further drying of the ribbon, nor will it have any deleterious effect on the optical properties of a panel incorporating such material. Such reworking may also tend to expel any bubbles formed in the layer on the support. Alternatively, again by way of example, the intumescent material may be further dried on the support so that on removal it is broken into grains. In such a case, the material will tend to break through any bubbles formed in the layer so that such bubbles are no longer enclosed by intumescent material. This is also especially advantageous in reducing or avoiding the presence of bubbles in a finished fire-screening panel. Such grains may for example be incorporated in a fire-screening panel as described in specification No. GB 2 023 452B.

Removal of water from the intumescent material by a method according to the invention can therefore take place much more rapidly than with previously known drying techniques and accordingly the factory space required for a given production rate is much reduced.

Water is preferably removed from said intumescent material while on said support to leave the material removed with a residual water content of at least 20 percent by weight. It is generally desirable for the water content of intumescent material incorporated in a transparent fire-screening panel to be in the range 25 percent to 35 percent by weight. It may be desirable to remove more water than this in cases where for example grains of intumescent material are to be incorporated in an aqueous binder in the panel, but removing water to leave a residual water content of less than 20 percent gives rise to considerable practical difficulties in rehydrating the intumescent material and in forming a transparent panel.

Advantageously, water is removed from said intumescent material while on said support to leave the material removed with a residual water content of at most 48 percent by weight.

It is preferred that said intumescent material be sandwiched as at least one stratum between a pair of glazing sheets. Such a stratum may, and preferably does, serve to bond such sheets together.

Preferably, said intumescent layer is removed from said support within 60 seconds of its application thereto, for example within 30 seconds. It is somewhat surprising in view of the very lengthy drying periods which have hitherto been envisaged that sufficient water can be removed from the intumescent material so quickly to give a material which is, after reworking or breaking, suitable for incorporation in a fire-screening panel, whether in sheet or granular form, but this is nonetheless the case.

Production can be further speeded up if said intumescent layer remains on said support for a period between 3 and 20 seconds, for example for less than 15 seconds, as is preferred.

Preferably, while the layer remains on said support it is heated by the support alone. This ensures that the free surface of the layer will be cooler than that surface which is in contact with the moving support and more humid than the free surface of a layer which is heated from above, so that the formation of a crust on that free surface will be inhibited. The formation of such a crust inhibits drying and is also particularly disadvantageous in the case where the intumescent material is to be incorporated into a transparent panel.

The moving support is preferably heated to a temperature in the range 90° C. to 140° C. inclusive, to obtain the most rapid drying without risking premature intumescence. Advantageously each support is heated to a temperature above 100° C. and in some embodiments of the invention, it is optimally heated to a temperature within the range 125° C. to 138° C. inclusive.

In some preferred embodiments of the present invention, the layer on the moving support is exposed to ambient atmosphere so that water vapour can readily be expelled therefrom. In other preferred embodiments, the atmosphere in contact with the layer during its drying is controlled, for example in accordance with BFG Glassgroup's published patent specification No. GB 2 047 862A.

The moving support is preferably a rotating drum, and the layer is preferably removed from the support by a doctor knife. Such a drum will take up less floor space than for example a horizontally running conveyor belt support and the use of a doctor knife can of itself be sufficient to rework or break the intumescent material as it is removed.

In some preferred embodiments of the invention, water is removed from said intumescent material while on said support to leave the material removed with a residual water content of not less than 42 percent by weight. When the method of the invention is performed in this way, the intumescent material in the layer on the moving support will tend to accumulate at the point where it is removed from the support thus reworking it, and it can be drawn off as a ribbon. Preferably such dried intumescent material is removed from the moving support as a ribbon. Such a ribbon (or rather a portion thereof) can then be applied to a glazing sheet to form a product for use as or in a fire-screening panel.

If desired the ribbon itself, or portions of such ribbon, supported for example by vitreous sheets, can be treated to adjust the water content of the intumescent material. Such adjustment may for example be effected by gently heating the intumescent material after its removal from the moving support on which initial drying took place. The adjustment of the water content of the intumescent material may for example be such as to bring the residual water content within the range 25 to 35 percent inclusive by weight of the intumescent composition prior to its use in the finished fire-screening panel. It has been found that a water content within that range imparts the best combination of fire-screening light-transmitting and aging properties to the intumescent material when incorporated into a panel. This is not to say that the optimum water content in intumescent material of an intermediate product for use in forming a fire-screening panel also lies within that range. For example, two such intermediate products each consisting of a glass sheet with an adherent layer of intumescent material may be assembled together with their intumescent layers in contact and then bonded to form a laminated fire-screening panel. The bonding step may be preceded by a degassing step in which the inter-sheet volume is subjected to low pressure conditions. It will be apparent that any such degassing step will not only aspirate gases from between the glass sheets, but will also remove some portion of the water remaining in the intumescent layers, and this should desirably be taken into account when selecting the preferred water content for the intumescent material prior to final assembly of the panel.

Any necessary subsequent adjustment of the water content of the intumescent material is preferably effected by heating such material after its removal from the moving support.

In other preferred embodiments of the invention, water is removed from said intumescent material while on said support to leave the material removed with a residual water content in the range 25 percent to 35 percent inclusive by weight. In such cases the intumescent material can be and preferably is removed from the moving support in granular form and it is then ready for immediate incorporation into a fire-screening panel.

Advantageously, said intumescent material is applied to said support in a layer whose thickness lies in the range 0.1 mm to 3.0 mm inclusive, and most advantageously within the range 0.4 mm to 1.5 mm inclusive. It may for example lie within the range 0.8 mm to 1.2 mm inclusive. It has been found that by working within at least one of these ranges, rapid drying of the layer can take place while giving a granular intermediate product which is especially suitable for incorporation in a said fire-screening panel.

In order to promote rapid drying of the layer on the moving support, it is preferred that said aqueous solution of intumescent material be applied to said support while the solution is at a temperature within the range 20° C. to 60° C. inclusive.

Preferably, said aqueous solution of intumescent material is applied to the support by means including a transfer roller. This is a very simple way of applying the solution, and the transfer roller can be used to ensure that the applied layer is smooth and has a uniform thickness.

The spacing between the transfer roller and the support can have an important effect on the way in which the solution is transferred. Preferably said support and transfer roller have a closest spacing of between 0.3 and 1.0 mm. This promotes a laminar transfer of a flow of solution to the support.

In some embodiments of the invention it is preferred that amounts of said solution be sprayed into the nip of said support and transfer roller so that layers of increased thickness can be dried.

Advantageously, said intumescent material is hydrated sodium silicate.

The invention includes a product manufactured by a method as herein defined.

Preferred embodiments of the invention will now be described with reference to the accompanying drawings in which.

Figure 1:
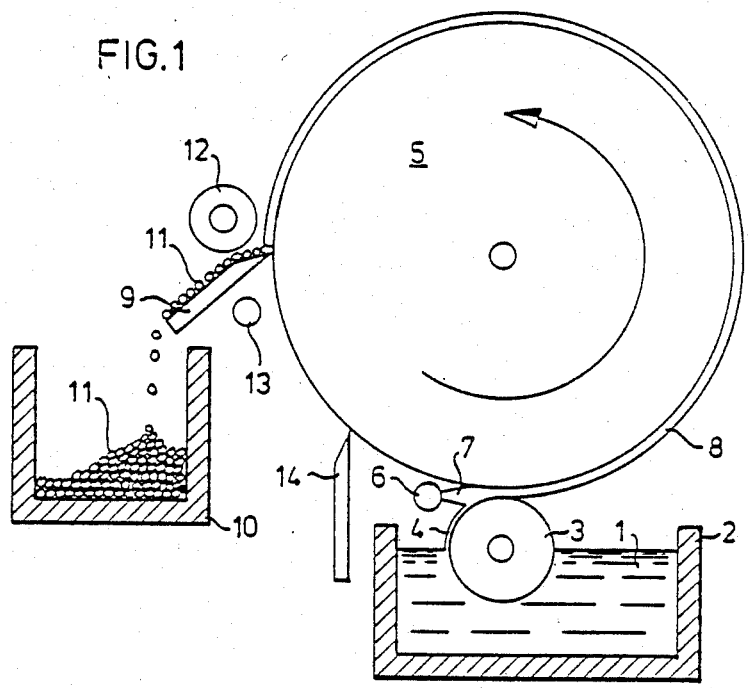
FIG. 1 is a schematic view of drying apparatus for carrying out a first process according to the invention.

In FIG. 1, an aqueous solution of intumescent material 1 to be incorporated in a fire-screening panel in accordance with the invention is held within a tank 2. This intumescent material may for example be a solution of sodium silicate ($SiO_2:Na_2O = 3.3$ to $3.4:1$) containing 60 percent to 70 percent water as is commercially available. The tank 2 is filled to the level shown so that a transfer roller 3 is partially immersed. As the transfer roller 3 rotates, it picks up the intumescent solution to be dried as a thin film 4 and transfers it onto the surface of a heated roller drum 5. In order to supplement the quantity of intumescent solution applied to the roller drum 5, an optional spray head 6 may be arranged to spray additional amounts 7 into the nip of the transfer roller 3 and drum 5 if desired. As the intumescent material passes through such nip it is spread out into a smooth uniform layer 8 on the drum. The level of the solution 1 in the tank 2 is maintained constant, for example, by setting an overflow at that level.

The drum 5 rotates against a doctor knife 9 mounted above a collecting pan 10 for the dried product. As the drum 5 rotates, water is progressively driven off from the intumescent solution and the dried product is picked up by the doctor knife 9 and is broken into grains 11 which are deposited as shown in the collecting pan 10.

In a specific practical example, a stainless steel drum 500 mm in diameter was heated so that its surface was maintained in the absence of the solution at a temperature of 130° C. The closest spacing between the transfer roller 3 and the drum 5 (that is, the spacing at their nip) was between 0.4 and 0.8 mm. A layer 8 of hydrated sodium silicate (63 percent $H_2O$) about 1 mm in thickness was applied to the drum 5 which rotated at 4 to 6 rpm by the transfer roller 3 which rotated at 80 to 180 rpm. The layer 8 was dried within three-quarters of a revolution forming grains 11 having a water content of between 25 and 30 percent by weight and sizes ranging between 150 $\mu$m and 450 $\mu$m. The grains are suitable for incorporating directly into a laminated fire-screening panel by a method described in No. GB 2 032 452A and for obtaining a transparent panel by said method. The hydrated sodium silicate 1 in the tank 2 was about 50° C.

In a variant of this example, the liquid intumescent material 1 in tank 2 was maintained at between 30° C. and 35° C.

A blower 12 is provided by the doctor knife 9 to assist in removal of the dried grain 11 from the drum 5. If desired this blower 12 may be replaced by a rotating brush.

Beyond the doctor knife 9, the drum 5 may be sprayed with water from an optional spray head 13 whereafter the drum may pass an optional second doctor knife 14. This can ensure that substantially no dried intumescent material remains adherent to the drum.

Figure 2:
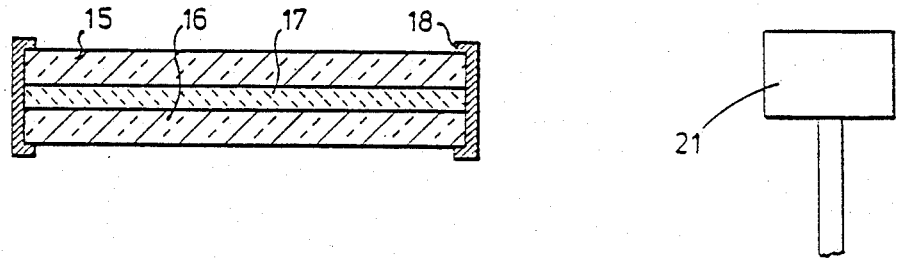
FIG. 2 shows a fire-screening panel incorporating a layer of intumescent material which has been manufactured by a method according to the invention.

FIG. 2 illustrates a fire-screening glazing panel comprising two sheets of glass 15, 16 which sandwich a stratum 17 of intumescent grains which have been dried as described with reference to FIG. 1. The panel is held together by a frame 18. If desired, the intumescent grains in the stratum 17 may be held together by a binder material, for example a solution of the intumescent material used. This would serve to increase the water content of the stratum 17 of intumescent material.

Figure 3:
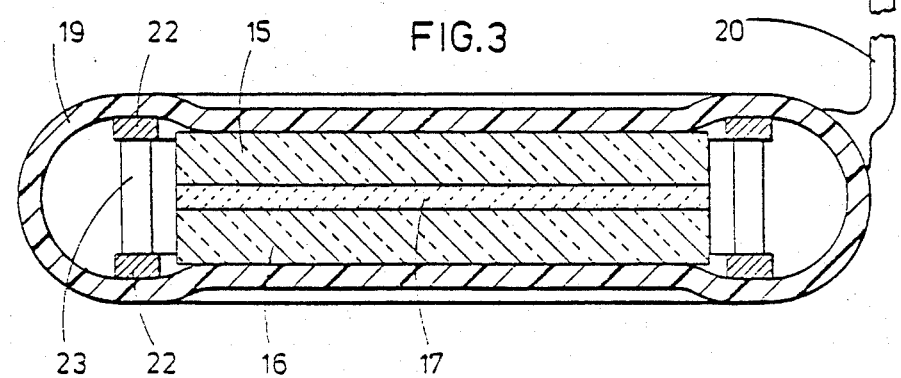
FIG. 3 illustrates a second stage of a process in accordance with the invention.

FIG. 3 illustrates an apparatus for use in converting a panel as shown in FIG. 2 into a transparent laminated fire-screening panel.

In FIG. 3, the panel sandwich consisting of the two sheets of glass 15, 16 and the granular intumescent interlayer 17 is enclosed within an envelope 19. The envelope is connected by a vacuum line 20 to a pump 21 by which sub-atmospheric pressure can be maintained within the envelope to keep the space between the sheets 15, 16 subjected to suction. When the pump is operated, the top and bottom walls of the envelope are drawn against the main external faces of the enclosed sandwich. However, the envelope at least at its peripheral zone, is sufficiently rigid to resist collapse against the edges of the sandwich so that a space at a sub-atmospheric pressure maintained by the pump 21 is preserved within the envelope, around the edges of the sandwich. The use of an envelope which encloses the sandwich affords the advantage that the size of the envelope in relation to the dimension of the sandwich is not critical. The envelope can be easily applied to sandwich of a range of different sizes. In addition, the envelope does not hinder uniform heating of the whole sandwich. Furthermore, the use of such an envelope facilitates the application of uniform pressure over the whole area of the main faces of the sandwich during its treatment, so that reaction forces arising from pressure differences between the environment in which the envelope is placed and the space within the envelope will not be such as to cause flexure of the outer sheets 15, 16 of the sandwich. Such flexure could lead to the formation of bubbles in the margins of the layer 17 and can also lead to a non-flat final product.

In a variant of the apparatus just described, optional bracing means are provided for supporting reaction forces arising from pressure differences between the interior and exterior of the envelope 19. In FIG. 3, such bracing means are shown as a pair of frames 22 of the same shape as but slightly larger than the sandwich assembly 15, 16, 17 which are held spaced apart by a plurality of pillars such as 23. The frames 22 hold the envelope slightly away from the edges of the assembly.

A sandwich assembly may be treated by the aspirating means shown in FIG. 3 in a simple process in which the exterior of the envelope 19 is always subjected to atmospheric pressure. In an example of the process, the pump 21 is switched on to reduce the pressure within the envelope, that is the pressure acting on the edges of the assembly, to between 10 and 250 mm Hg. The value is reached after about one or two minutes, and it is maintained for a further 40 to 45 minutes. The sandwich assembly is initially at room temperature (20° C.) and remains at this temperature for about 15 minutes after the pump 21 is switched on. The temperature is not increased during this initial period because it is believed the grains would soften and start to coalesce because of the wide difference between the edge pressure (less than 250 mm Hg) and the environmental pressure (atmospheric) and this would impede degassing of the intumescent layer and the consequent entrapment of air bubbles in the finished panel.

After 15 minutes, the sandwich assembly in the envelope 19 is heated uniformly so that it reaches a temperature of 90° C. after 45 minutes, and at this stage the pressure in the envelope is allowed to return to atmospheric. At the end of this time, the sandwich assembly is found to be bonded together as a transparent panel. Of course this panel may then be transferred to an autoclave for a subsequent high-pressure bonding step if desired.

Figure 4:
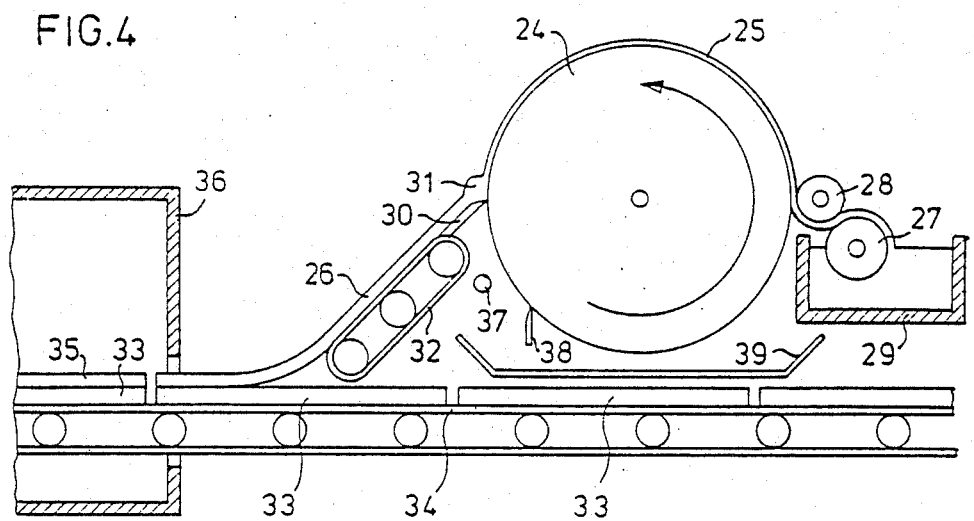
FIG. 4 is a schematic view of apparatus for use in the performance of a second process according to the invention.

FIG. 4 illustrates a drum 24 supporting a layer 25 of intumescent material which is to be drawn off the drum as a ribbon 26. The layer is applied to the drum 24 by a pair of transfer rollers 27, 28 from a reservoir 29 and is removed from the drum by a doctor knife 30. In an alternative embodiment, there is a single transfer roller with or without a spray such as that shown at 6 in FIG. 1. As shown in FIG. 4, the intumescent material in the layer 25 accumulates at 31 in front of the doctor knife 30 so that it is there reworked and is thence drawn off as the ribbon 26. In order to allow the intumescent material to be drawn off as a ribbon, the layer 25 is dried so that its residual water content remains at least 42 percent by weight at all places on the drum 24. The speed at which the ribbon 26 is drawn off may be adjusted to allow the ribbon 26 to be thicker than the layer 25 from which its intumescent material derives.

The ribbon 26 is led down a conveyor 32 onto sheets 33 of vitreous material which are located on a second cnveyor belt 34 arranged to transport the sheets 33 at an appropriate ribbon-removal speed, whereafter the intumescent ribbon 26 is cut to form strata such as 35 resting on the sheets 33. As shown, the conveyor 34 is arranged to transport the vitreous sheets 33 bearing their intumescent strata 35 through a tunnel heating chamber 36 so that the water content of the intumescent strata 35 can be further reduced to a value suitable for a fire-screening panel.

An optional spray head 37 is provided for washing the drum 24 after removal of the layer 25, and a second doctor knife 38 is optionally provided for removing any residual intumescent material prior to the application of the layer 25.

In a specific example, a stainless steel drum 500 mm in diameter was rotated at 11 rpm while its surface was maintained at a temperature in the range 102°-103° C. A 0.1 mm film of the sodium silicate solution referred to above was applied and was dried to leave a water content of between 42 percent and 45 percent within 4 seconds.

The ribbon 26 is drawn off from the drum 24 at such a speed that its thickness is of the order of 1 mm. The ribbon is deposited on glass sheets as indicated above, and the water content of the intumescent material is reduced to about 33 to 34 percent by passing the coated sheets through the tunnel heating chamber 36 in which is maintained a temperature of about 90° C. and a relative humidity of about 90 percent.

Figure 5:
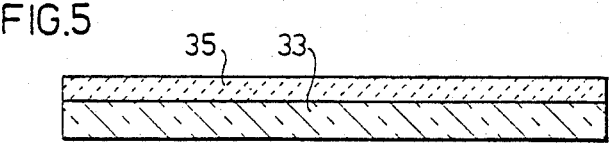
FIGS. 5 and 6 illustrate further fire-screening panels which have been manufactured in accordance with the invention.

A product of the process described with reference to FIG. 4 is shown in FIG. 5 and consists of a glass sheet 33 bearing an adherent dried stratum 35 of transparent intumescent material. Such a product may be used on its own, but it preferably forms an intermediate product in the manufacture of a sandwich construction panel. For example a second sheet of glass may be laid on top of the intumescent stratum and the thus formed panel may then simply be framed, or it may be subjected to a laminating process similar to that described with reference to FIG. 3.

Figure 6:
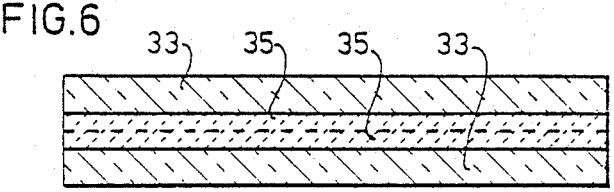

Alternatively, and as shown in FIG. 6, two such products may be assembled face to face and then be framed or laminated together.

We claim:

1. A method of manufacturing a transparent fire-screening panel comprising at least one glazing sheet and associated intumescent material, characterized in that the panel is formed by a process which includes forming a layer containing an aqueous solution of intumescent material on a cylically moving support, removing water from the layer of material on the support by applying heat to give the material a residual water content of 20 to 48% inclusive by weight, removing the intumescent layer from the support within one cycle of its application thereof in such manner that the layer becomes reworked or broken, and incorporating the removed intumescent material into a said panel before or after making any further required adjustment to the water content of the intumescent material.

2. A method according to claim 1, wherein the said intumescent material is sandwiched as at least one stratum between a pair of glazing sheets.

3. A method according to claim 1, wherein said intumescent layer is removed from said support within 60 seconds of its application thereto.

4. A method according to claim 3, wherein said intumescent layer remains on said support for a period between 3 and 20 seconds.

5. A method according to claim 1, wherein while said layer remains on said support it is heated by the support alone.

6. A method according to claim 1, wherein said support is heated to a temperature in the range 90° C. to 140° C. inclusive.

7. A method according to claim 1, wherein the layer on the support is exposed to the ambient atmosphere.

8. A method according to claim 1, wherein said support is constituted by a rotating drum.

9. A method according to claim 1, wherein said intumescent layer is removed from said support by a doctor knife.

10. A method according to claim 1, wherein water is removed from said intumescent material while on said support to leave the material removed with a residual water content of not less than 42 percent by weight.

11. A method according to claim 10, wherein the intumescent material is removed from said support as a ribbon.

12. A method according to claim 1, wherein any further required adjustment of the water content of the intumescent material is effected by heating.

13. A method according to claim 1, wherein water is removed from said intumescent material while on said support to leave the material removed with a residual water content in the range 25 percent to 35 percent inclusive by weight.

14. A method according to claim 13, wherein said intumescent material is removed from said support in granular form.

15. A method according to claim 13, wherein said intumescent material is applied to said support in a layer whose thickness lies in the range 0.1 mm to 3.0 mm inclusive.

16. A method according to claim 15, wherein the thickness of such applied layer lies in the range 0.4 mm to 1.5 mm inclusive.

17. A method according to claim 1, wherein said aqueous solution of intumescent material is applied to said support while the solution is at a temperature in the range 20° C. to 60° C. inclusive.

18. A method according to claim 1, wherein said aqueous solution of intumescent material is applied to said support by means including a transfer roller.

19. A method according to claim 18 wherein said support and said transfer roller have a closest spacing of between 0.3 mm and 1.0 mm.

20. A method according to claim 18, wherein amounts of said solution are sprayed into the nip of said support and transfer roller.

21. A method according to claim 1, wherein said intumescent material is hydrated sodium silicate.

22. A fire-screening panel manufactured by a method according to claim 1.

* * * * *